(12) United States Patent
Zlotnick

(10) Patent No.: US 8,024,256 B2
(45) Date of Patent: Sep. 20, 2011

(54) METHOD TO PRIORITIZE PRODUCT REQUIREMENTS

(75) Inventor: Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 12/207,607

(22) Filed: Sep. 10, 2008

(65) Prior Publication Data

US 2010/0063918 A1    Mar. 11, 2010

(51) Int. Cl.
G06Q 40/00    (2006.01)
(52) U.S. Cl. ............................................. 705/37; 705/35
(58) Field of Classification Search .................. 705/37
See application file for complete search history.

(56) References Cited

U.S. PATENT DOCUMENTS

2009/0112705 A1*    4/2009    Eiben et al. .................... 705/12

OTHER PUBLICATIONS

Requirements Prioritization Introduction, [online]; [retrieved on Sep. 10, 2008]; retrieved from the Internet https://buildsecurityin.us-cert.gov/daisy/bsi/articles/best-practices/requirements/545-BSI.html.

* cited by examiner

Primary Examiner — James Kramer
Assistant Examiner — Samica L Norman
(74) Attorney, Agent, or Firm — Cantor Colburn LLP; Suzanne Erez

(57) ABSTRACT

A method for prioritizing features that can be incorporated into a product, the method including: issuing a weighting factor to each stakeholder having an economic interest in the product, a size of the weighting factor being proportional to a size of a budget for each stakeholder; bidding an amount of the weighting factor for each feature by each stakeholder, a total amount bid by each stakeholder is not to exceed the size of the weighting factor issued to each stakeholder; summing the amounts bid for each feature to provide a total feature bid for each feature; and prioritizing the features in order from highest total feature bid to lowest total feature bid.

6 Claims, 2 Drawing Sheets

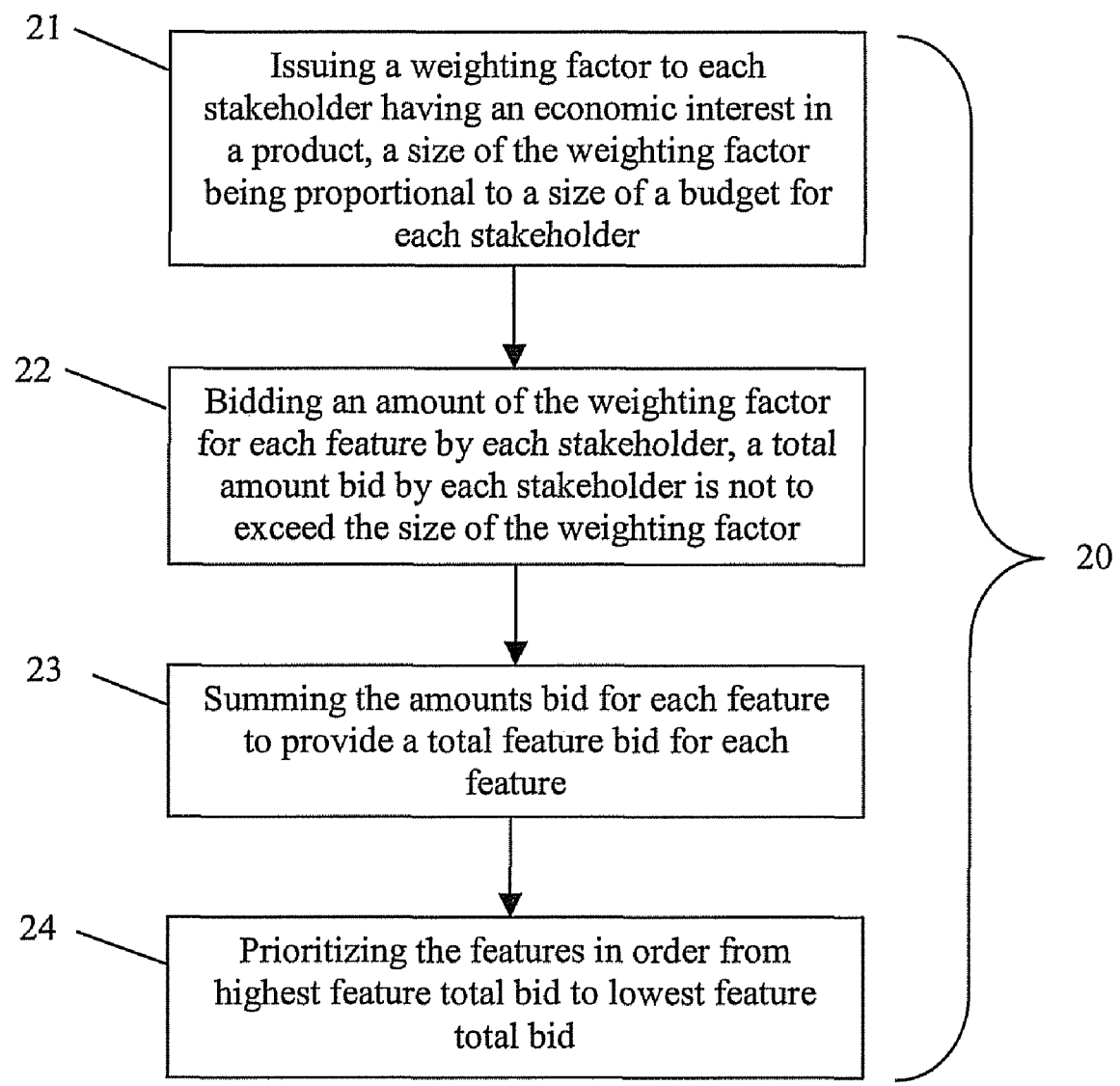

METHOD TO PRIORITIZE PRODUCT REQUIREMENTS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field of the Invention

The present application relates to setting a priority in developing features of a product.

2. Description of the Related Art

Developing a new product can pose many challenges. The product can be designed with many different features. Some of these features may be sought after by groups supporting the product. Unfortunately, budgets are often limited and not all features can be incorporated into the product.

A new product, especially a computer processing product, may require support by various support groups. For example, a field service group may have to send a technician on a field call to service the product. Another support group, such as a development group, may have to analyze defects as the defects occur.

The new product can be designed to incorporate special features that improve the efficiency of the support groups. Each of the special features, though, comes at a price. Presently, each of the support groups argues for a particular special feature on equal ground with the other support groups. However, by arguing on equal ground, the special features that are most cost effective may not be incorporated.

Therefore, what are needed are techniques to prioritize features to be incorporated into a product.

BRIEF SUMMARY

The shortcomings of the prior art are overcome and additional advantages are provided through the provision of a method for prioritizing features that can be incorporated into a product, the method including: issuing a weighting factor to each stakeholder having an economic interest in the product, a size of the weighting factor being proportional to a size of a budget for each stakeholder; bidding an amount of the weighting factor for each feature by each stakeholder, a total amount bid by each stakeholder is not to exceed the size of the weighting factor issued to each stakeholder; summing the amounts bid for each feature to provide a total feature bid for each feature; and prioritizing the features in order from highest total feature bid to lowest total feature bid.

Also disclosed is a computer program product stored on machine-readable media, the product having machine-executable instructions for prioritizing features that can be incorporated into a product, the instructions including: issuing virtual money to each stakeholder having an economic interest in the product, the amount of the virtual money being proportional to a size of a budget for each stakeholder for supporting the product; spending an amount of the virtual money for each feature by each stakeholder, a total amount bid by each stakeholder is not to exceed the size of the virtual money issued to each stakeholder; summing the amounts bid for each feature to provide a total feature bid for each feature; and prioritizing the features in order from highest total feature bid to lowest total feature bid.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

FIG. 2 presents one example of a method for prioritizing features that can be incorporated into a product.

Figure 1:
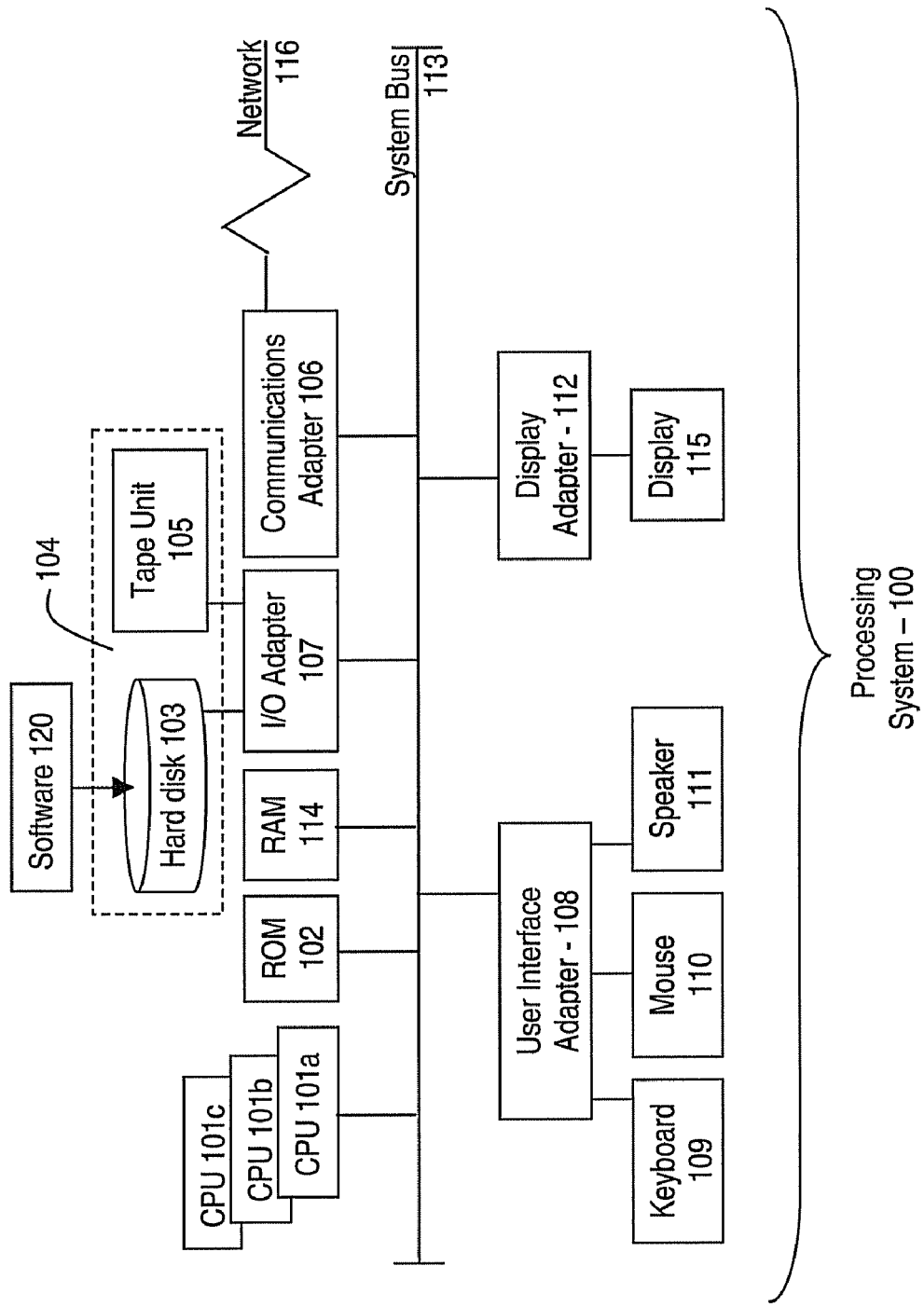
FIG. 1 illustrates one example of a processing system for practice of the teachings herein.

The detailed description explains the preferred embodiments of the invention, together with advantages and features, by way of example with reference to the drawings.

DETAILED DESCRIPTION

Disclosed are techniques for prioritizing features to be incorporated into a product. The techniques, which include method and apparatus, call for issuing an amount of virtual money to stakeholders who have an economic interest in a feature of the product. The amount of virtual money is proportional to the yearly budget that each stakeholder has for support of the product. Each stakeholder then pays for any desired feature that the stakeholder wants using the virtual money. The desired feature generally improves the efficiency of the service performed by the stakeholder. The features are then prioritized or ranked from the highest amount of virtual money spent to the lowest amount.

If a first stakeholder wants more than one support feature, support features A and B for example, then the first stakeholder can spend or bid an amount of the virtual money in relation to an amount of desire for support feature A and support feature B. The amount of desire of each support feature generally being related to the cost efficiency associated with each support feature. A second stakeholder may also want one of the support features that the first stakeholder wants, support feature A for example. The second stakeholder will spend a certain amount of the virtual money on support feature A. The ranking of support feature A, therefore, will be based on the sum of the amounts of virtual money spent on support feature A by the first stakeholder and the second stakeholder. Thus, the ranking of support feature A will consider the cost efficiency to the first and second stakeholders.

As an example, consider that a Field Support organization may be budgeted to send technicians to 1000 field calls, and a certain desired feature can save one hour per call. Thus, the certain desired feature is worth 1000 technician hours in time saved to the Field Support organization. Also, consider that a Development organization may be budgeted to analyze 700 defects. If another desired feature shortens the time needed to analyze a defect by two hours, then that other desired feature is worth 1400 developer hours to the Development organization. Previous art would give Field Support and Development the same weight in influencing the features to be incorporated into the product, but the overall organization is better off with the second feature.

The benefit of issuing virtual money proportional to the stakeholder's yearly support budget is that it gives a realistic weight to a requested feature. The requests of stakeholders are balanced by the size of the stakeholders' support budgets. Thus, each stakeholder spends an amount of virtual money in accordance with priorities of the support features desired. The final ranking of each support feature depends upon the total amount of virtual money spent for each of the support features. Therefore, the final ranking is most the most cost effective ranking.

In order to spur collaboration between the various support groups, the amount of virtual money spent on a desired feature by one support group can be shared with the other support groups. One support group by collaborating with other support groups may decide to reorder priorities of the desired features knowing that there may be a higher probability of getting certain features incorporated.

For convenience, certain definitions are presented. The term "virtual money" relates to any weighting factor or points system that may be assigned or issued to each support group for use in prioritizing the features to be incorporated into a product. The term "feature" relates to at least one of hardware, software, documentation, and publications that may be incorporated into or associated with a product being developed by a company. The feature can improve the efficiency of a group that supports the product in the company. The term "stakeholder" relates to a person or group of people in an organization that develops a product. Stakeholders are tasked with providing different types of support to the product. The stakeholders have an economic incentive to have a feature that improves efficiency incorporated into the product.

A processing system used for prioritizing features that may be incorporated into a product is now presented. Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. A communications adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing means in the form of processors 101, storage means including system memory 114 and mass storage 104, input means such as keyboard 109 and mouse 110, and output means including speaker 111 and display 115. In one embodiment, a portion of system memory 114 and mass storage 104 collectively store an operating system such as the AIX® operating system from IBM Corporation to coordinate the functions of the various components shown in FIG. 1.

It will be appreciated that the system 100 can be any suitable computer or computing platform, and may include a terminal, wireless device, information appliance, device, workstation, mini-computer, mainframe computer, personal digital assistant (PDA) or other computing device.

Examples of operating systems that may be supported by the system 100 include Windows 95, Windows 98, Windows NT 4.0, Windows XP, Windows 2000, Windows CE, Windows Vista, Macintosh, Java, Linux, and UNIX, or any other suitable operating system. The system 100 also includes a network interface 116 for communicating over a network. The network can be a local-area network (LAN), a metro-area network (MAN), or wide-area network (WAN), such as the Internet or World Wide Web. A server (not shown) can be connected to the network. The server can run the virtual world program to provide the virtual world to the user via the display 115.

Users of the system 100 can connect to the network through any suitable network interface 116 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 100 includes machine-readable instructions stored on machine-readable media (for example, the hard disk 104) for capture and interactive display of information shown on the screen 115 of a user. As discussed herein, the instructions are referred to as "software" 120. The software 120 may be produced using software development tools as are known in the art. Also discussed herein, the software 120 may also referred to as "feature prioritizing software" 120. The feature prioritizing software 120 may include various tools and features for providing user interaction capabilities as are known in the art.

In some embodiments, the feature prioritizing software 120 is provided as an overlay to another program. For example, the software 120 may be provided as an "add-in" to an application (or operating system). Note that the term "add-in" generally refers to supplemental program code as is known in the art. In such embodiments, the software 120 may replace structures or objects of the application or operating system with which it cooperates.

The feature prioritizing software 120 generally provides users with a capability to interface with local applications or components. In general, the software 120 can interface with computer application code programs (for example, C, C++, Perl, Java and others), other programs typically regarded as computing environments (UNIX, Linux, DOS, and others) as well as other types of programs.

In one embodiment, each support group and a higher management group has a processing system 100 capable of running the feature prioritizing software 120. The processing systems 100 can communicate with each other via a network such as one discussed above. The higher management group can issue an amount of virtual money to each support group using the processing systems 100. In turn, each support group can use an associated processing system 100 to spend the virtual money on the desired product features. Information on how the virtual money is spent on each product feature is sent to the processing system 100 associated with the higher management group. From the information, the higher management group can set the priorities for incorporating each desired feature into the product.

FIG. 2 presents one example of a method 20 for prioritizing features that can be incorporated into a product. The method 20 calls for (step 21) issuing a weighting factor to each stakeholder having an economic interest in the product, a size of the weighting factor being proportional to a size of a budget for each stakeholder. The weighting factor can be virtual money or a points system. Further, the method 20 calls for (step 22) bidding an amount of the weighting factor for each feature by each stakeholder, a total amount bid by each stakeholder is not to exceed the size of the weighting factor issued to each stakeholder. Further, the method 20 calls for (step 23) summing the amounts bid for each feature to provide a total feature bid for each feature. Further, the method 29 calls for (step 24) prioritizing the features in order from highest total feature bid to lowest total feature bid. The method 20 can also include disclosing the amount bid for each feature by one stakeholder to the other stakeholders, and then iteratively repeating steps 22-24.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The term "or" when used with a list of at least two terms is intended to mean any term or combination of terms.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for prioritizing features that can be incorporated into a product, the method comprising:

issuing a weighting factor to each stakeholder having an economic interest in the product, a size of the weighting factor being proportional to a size of a budget for each stakeholder;

bidding an amount of the weighting factor for each feature by each stakeholder, a total amount bid by each stakeholder is not to exceed the size of the weighting factor issued to each stakeholder;

summing the amounts bid for each feature to provide a total feature bid for each feature; and prioritizing the features in order from highest total feature bid to lowest total feature bid;

wherein the issuing, the bidding, the summing, and the prioritizing are implemented using a computer processing system.

2. The method of claim 1, wherein the budget comprises a budget for supporting the product.

3. The method of claim 1, wherein the weighting factor comprises virtual money.

4. The method of claim 1, wherein the weighting factor comprises a point system.

5. The method of claim 1, further comprising disclosing the amount of the weighting factor bid by one stakeholder for each feature to other stakeholders.

6. A non-transitory computer readable medium comprising computer-executable instructions for prioritizing features that can be incorporated into a product by implementing a method comprising:

issuing virtual money to each stakeholder having an economic interest in the product, the amount of the virtual money being proportional to a size of a budget for each stakeholder for supporting the product;

spending an amount of the virtual money for each feature by each stakeholder, a total amount bid by each stakeholder is not to exceed the size of the virtual money issued to each stakeholder;

summing the amounts bid for each feature to provide a total feature bid for each feature; and prioritizing the features in order from highest total feature bid to lowest total feature bid.

* * * * *